United States Patent
Grenouillat et al.

(10) Patent No.: US 11,549,288 B2
(45) Date of Patent: Jan. 10, 2023

(54) VEHICLE DOOR HANDLE ASSEMBLY

(71) Applicant: U-SHIN DEUTSCHLAND ZUGANGSSYSTEME GMBH, Erdweg (DE)

(72) Inventors: Regis Grenouillat, Erdweg (DE); Anton Linder, Erdweg (DE); Norbert Lehmeier, Erdweg (DE); Tomas Smeringai, Kosice (SK)

(73) Assignee: U-SHIN DEUTSCHLAND ZUGANGSSYSTEME GMBH, Erdweg (DE)

( * ) Notice: Subject to any disclaimer, the term of this patent is extended or adjusted under 35 U.S.C. 154(b) by 135 days.

(21) Appl. No.: 16/772,341

(22) PCT Filed: Dec. 13, 2018

(86) PCT No.: PCT/EP2018/084847
§ 371 (c)(1),
(2) Date: Jun. 12, 2020

(87) PCT Pub. No.: WO2019/115734
PCT Pub. Date: Jun. 20, 2019

(65) Prior Publication Data
US 2021/0017795 A1   Jan. 21, 2021

(30) Foreign Application Priority Data

Dec. 14, 2017 (EP) .................................. 17207510

(51) Int. Cl.
*E05B 85/10* (2014.01)
*E05B 77/42* (2014.01)
(Continued)

(52) U.S. Cl.
CPC ............ *E05B 85/107* (2013.01); *E05B 77/42* (2013.01); *E05B 81/06* (2013.01); *E05B 81/34* (2013.01);
(Continued)

(58) Field of Classification Search
CPC ...... E05B 85/103; E05B 85/107; E05B 85/10; E05B 85/16; E05B 77/42; E05B 81/06;
(Continued)

(56) References Cited

U.S. PATENT DOCUMENTS

2011/0148575 A1* 6/2011 Sobecki ................. E05B 17/10
292/336.3
2014/0338478 A1* 11/2014 Adam ..................... F16H 19/02
74/89.14
(Continued)

FOREIGN PATENT DOCUMENTS

EP   3 255 231 A1   12/2017
FR   2889553 A1 *   2/2007 ............. E05B 81/14
(Continued)

OTHER PUBLICATIONS

Combined Chinese Office Action and Search Report dated Apr. 30, 2021 in Chinese Patent Application No. 201880080087.4 (with English translation), 15 pages.
(Continued)

*Primary Examiner* — Christine M Mills
*Assistant Examiner* — Christopher F Callahan
(74) *Attorney, Agent, or Firm* — Oblon, McClelland, Maier & Neustadt, L.L.P.

(57) ABSTRACT

A transmission mechanism for a vehicle door handle is provided, the handle including a handle lever, movable between a flushing position and a ready position, the mechanism attachable to the lever and to an electric motor, and including a lever shaft connectable to the lever, a rotation of
(Continued)

which causes motion between the positions; a reduction mechanism to adapt an output torque of the motor into a rotational motion of the shaft, including first and second reduction stages each having a worm drive, the first including a first worm and a first worm gear, and the second having a second worm and another worm gear rotationally coupled to the shaft; and a brake mechanism frictionally engaging a rotating element of one of the stages when the shaft reaches a rotational braking position between the positions to stop the shaft in a position where the lever is in the ready position.

16 Claims, 4 Drawing Sheets

(51) Int. Cl.
| | |
|---|---|
| E05B 81/06 | (2014.01) |
| E05B 81/34 | (2014.01) |
| E05B 85/16 | (2014.01) |
| F16H 19/02 | (2006.01) |
| F16H 21/52 | (2006.01) |
| E05B 81/76 | (2014.01) |

(52) U.S. Cl.
CPC .............. *E05B 85/16* (2013.01); *F16H 19/02* (2013.01); *F16H 21/52* (2013.01); *E05B 81/76* (2013.01); *E05Y 2201/21* (2013.01); *E05Y 2400/32* (2013.01); *E05Y 2900/531* (2013.01)

(58) Field of Classification Search
CPC .......... E05B 81/34; E05B 81/76; E05B 5/003; E05B 5/006; E05B 5/00; F16H 19/02; F16H 21/52; Y10S 292/31
See application file for complete search history.

(56) References Cited

U.S. PATENT DOCUMENTS

2016/0290018 A1* 10/2016 Hamacher ............. E05B 85/103
2018/0171686 A1* 6/2018 Couto Maquieira ... E05B 77/54

FOREIGN PATENT DOCUMENTS

| | | | |
|---|---|---|---|
| JP | 2005194712 A | * | 7/2005 |
| JP | 2012500912 A | * | 1/2012 |
| WO | WO 2017/125653 A1 | | 7/2017 |

OTHER PUBLICATIONS

International Search Report dated Apr. 9, 2019 in PCT/EP2018/084847 filed on Dec. 13, 2018.
Japanese Office Action dated Apr. 26, 2022 in Japanese Patent Application No. 2020-532697 (with English summary), 4 pages.

* cited by examiner

VEHICLE DOOR HANDLE ASSEMBLY

TITLE

BACKGROUND

The present invention concerns a transmission mechanism for a vehicle door assembly, in particular of the type with a flushing door handle lever.

Such a transmission mechanism for vehicle door handle assembly is connected to an electric motor which, when actuated, moves the handle lever between a flushing position and a ready position. In the flushing position, the handle lever is flush with the exterior surface of the door body. In the ready position, the handle lever is protruding from said exterior surface, so as to be graspable by a user.

Once the user grasps the handle lever in its ready position, he can unlatch the door by pulling the lever in a further protruding unlocking position, in which the handle door lever interacts (via a Bowden cable, a rotating pin or a gear mechanism) with a latch mechanism and unlatches the door.

A handle lever spring brings the handle lever back in its ready position when the user releases the handle lever. The electric motor may also move the handle lever from the ready position to the flushing position after opening or closing the door.

When a user opens the door with important speed, the user pulls on the lever, which is in open (extended) position, to open the door. Once the door panel reaches a sufficiently open position, the user will stop the motion by pushing on the handle lever to stop the door panel motion.

The lever is then quickly driven back from open to ready or flushing position by inertial forces. During this motion, a reduction mechanism of the handle is actuated in reverse, potentially with high movement speed.

In normal functioning, the electric motor sets the handle lever in motion via the reduction mechanism, comprising for example a set of worm and gear drives, which reduces the rotational speed of the motor actuation while increasing torque value. To grant access to the vehicle in case of electrical or mechanical actuation failure (empty battery, electric motor malfunction), a push-push unit using an armed spring is added to the handle.

To release the spring of the push-push unit, the user pushes the handle lever inwards into a clicking position. The released spring pushes the handle lever in its ready position.

When the user pushes the lever from the flushing to the clicking position, said reduction mechanism has to be actuated in reverse.

For the handle spring not to bring the handle lever spontaneously back to flushing position while allowing reverse actuation of the mechanism, a fine tuning of the friction between parts is required, which may not be ensured over the wide temperature range encountered and the lifespan of the vehicle. Furthermore the tolerances of the component dimensions may not allow said fine tuning.

BRIEF SUMMARY

Consequently, the user may experience either the handle lever returning in flushing position when the electric motor ceases applying a torque, thus reducing the perceived quality, or a complete mechanical failure if the reduction mechanism is broken during a reverse actuation. In order to overcome the aforementioned drawbacks, the present invention has for object a transmission mechanism for a vehicle door handle, the vehicle door handle comprising a handle lever, movable in particular between a flushing position in which it is flush with an exterior door panel surface and a ready position in which it is protruding and graspable by a user, the transmission mechanism being configured to be attached on one side to a handle lever and on the other side to an electric motor, said transmission mechanism comprising:
a lever shaft, configured to be connected to the handle lever, the rotation of which causes the motion of the handle lever between the flushing and ready positions,
a reduction mechanism, configured to adapt an output torque of the electric motor into a rotational motion of the lever shaft, comprising a first reduction stage and a second reduction stage, having each a worm drive, the worm drive of the first reduction stage comprising a first worm and a first worm gear, and the worm drive of the second reduction stage having a second worm and a worm gear rotationally coupled to the lever shaft, wherein the transmission mechanism comprises a brake mechanism frictionally engaging a rotating element of one of the reduction stages of the reduction mechanism when the lever shaft reaches a rotational braking position comprised between the flush and ready positions of the handle lever, to stop the lever shaft in a position in which said handle lever in the ready position.

By integrating a dedicated and simple brake mechanism, the ready position is kept stable over a wide range of temperatures, while the reduction mechanism can be conceived to be highly irreversible. Wear and unwanted retraction of the lever is thus reduced.

The vehicle door handle transmission mechanism may present one or more of the following characteristics, taken separately or in combination.

The brake mechanism engages a rotating element of the first reduction stage.

The brake mechanism comprises a braking pad and a radially protruding finger bound in rotation with the lever shaft, the radially protruding finger and the braking pad being configured so that when the lever shaft reaches a rotational position corresponding to the braking position of the handle lever, the radially protruding finger presses the braking pad against a rotating element of a reduction stage of the reduction mechanism.

The first worm gear of the first reduction stage comprises an axial, cylindrical protrusion, against which the braking pad is pressed when the handle lever reaches the braking position.

The braking pad comprises a circular arc surface matching the axial cylindrical protrusion and which is pressed against said axial cylindrical protrusion when the handle lever reaches the braking position.

The braking pad comprises a ramp on which the radially protruding finger of the lever shaft is pushing when reaching the braking position.

The radially protruding finger is an extension of a push-push lever configured to cooperate, when the vehicle door handle is assembled, with a push-push unit to bring the lever in a position in which it is graspable by a user in case of mechanical or electrical failure of the electric actuation mechanism.

The rotational position of the handle lever is detected by positioning means, attached to the lever shaft so as to be able to know the rotational position of said lever shaft and command its movement back to flush position or into ready position using an electronic control unit connected on one hand to the positioning means and on the other hand to the electric motor.

It further comprising a preconstrained spring fitting the contours of a cylindrical spring cage surrounding the lever shaft, which exerts, when the handle lever reaches the braking position, a strength on the braking pad, pressing said braking pad on the rotating element of the reduction mechanism.

The cylindrical spring cage may comprise:
a tubular housing, bound in rotation to a stationary handle frame, having a radial flange on which one end of the preconstrained spring rests,
a locking ring, mobile axially and bound in rotation with respect to the tubular housing, against which the other end of the preconstrained spring rests,
an activation ring, rotationally linked to the lever shaft, pressed against the locking ring,
the locking ring and the activation ring comprising axial spacing protrusions facing each other when the handle lever reaches the braking position so as to increase the constriction of the preconstrained spring between the braking and ready positions of the handle lever.

The axial spacing protrusions may further comprise trapezoidal protrusions which are regularly distributed on the locking ring and the activation ring.

The tubular housing may comprise L or J-shaped grooves, which cooperate with pins of locking ring and the preconstrained spring to form a bayonet mount.

Another object of the invention is the associated vehicle door handle, having a handle lever movable between a flushing position in which it is flush with an exterior door panel surface and a ready position in which it is protruding and graspable by a user,
comprising:
an electric motor to set the handle lever in motion,
a transmission mechanism as previously described, connected on one side to the electric motor and on the other side to the handle lever,
wherein the transmission mechanism comprises a brake mechanism frictionally engaging a rotating element of a reduction stage of the reduction mechanism when the lever shaft reaches a rotational braking position comprised between the flush and ready positions of the handle lever to stop said handle lever in the ready position.

The door handle may further comprise a push-push unit to bring the lever in a position in which it is graspable by a user in case of a failure of the electric motor by interacting with a radially protruding push-push lever bound in rotation with the lever shaft.

The radially protruding finger may then be an extension of a push-push lever.

Alternatively, he radially protruding finger and the push-push lever may be two different radially protruding elements bound in rotation with the lever shaft.

The axial spacing protrusions comprise trapezoidal protrusions which are regularly distributed on the locking ring and the activation ring.

The tubular housing comprises L or J-shaped grooves, which cooperate with pins of locking ring and the preconstrained spring to form a bayonet mount.

Another object of the invention is the associated vehicle door handle,

BRIEF DESCRIPTION OF THE DRAWINGS

Other characteristics and advantages of the invention will appear at the reading of the following description, given in an illustrative and not limiting fashion, of the following figures, among which.

DETAILED DESCRIPTION

In all figures, the same references apply to the same elements.

Though the figures refer to precise embodiments of the invention, other embodiments may be obtained by combining or altering slightly the represented embodiments, said new embodiments are also within the scope of the invention.

Figure 1:
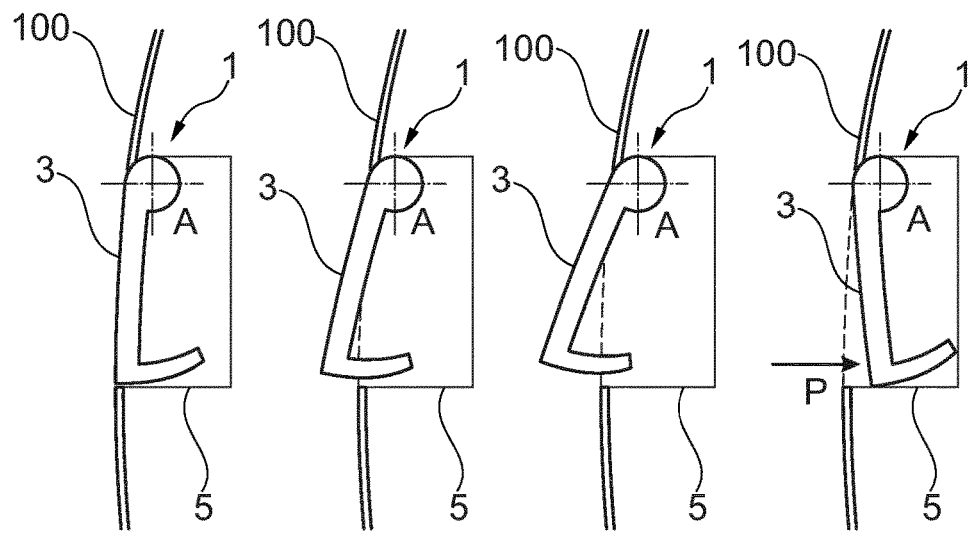
FIG. 1 is a schematic cut away of a vehicle door with a handle comprising a handle lever represented in different positions.

FIG. 1 shows a series of schematic cutaways of a vehicle door panel 100 having a built-in door handle 1. The door panel 100 forms an exterior surface of the vehicle, the door handle 1 is essentially represented by its handle lever 3 (the part meant to be grasped and set in motion by a user) and a handle frame 5 (part that remains stationary during actuation).

The terms like "inwards", "outwards" and equivalents are defined with respect to the vehicle interior and exterior.

In the first cutaway of FIG. 1, the handle lever 3 is in a flushing position. In said flushing position, the outer surface of the handle lever 3 is flushing with the door panel 100. Said flushing position is adopted when the vehicle is driving and when it is parked for longer times. In flushing position, the handle lever 3 is less likely, when parked, to be interacted with by passers-by, accidentally or not, and air drag is reduced when driving. In the flushing position, the handle lever 3 also appears integrated in the door panel 100 in a pleasant and discrete way.

In the second cutaway of FIG. 1, the handle lever 3 is in a ready position. In said ready position, the handle lever 3 has rotated outwards by a predefined angle (20 to 45° for example) around a handle axis A, so as to be graspable by the user. Said ready position is adopted when the user approaches the vehicle or causes unlocking of the doors, for example using a remote control integrated in a key or a RFID security token. In said position the handle lever 3 is available and graspable for the user, but the handle is still latched.

In the third cutaway of FIG. 1, the handle lever 3 is in an open position. Compared to the ready position, the handle lever 3 has been rotated further outwards (40° to 60° and more) by the user, and the handle lever interacts with a latch mechanism to unlatch the door, which is consequently unlatched and ready to be opened by pulling further on the handle lever 3.

In the event of a mechanical or electrical failure of the actuation mechanism that drives the lever 3 from the flushing position to the ready position, the user can push the lever 3 inwards with respect to the door panel 100, as in the fourth cutaway of FIG. 1, by applying inwards directed pressure P on the handle lever 3. The handle lever 3 is then in a position herein called clicking position, where a mechanical interaction (a "click") releases a spring of a push-push unit that drives the lever 3 in a rotational position where it is graspable by the user without actuation of a motor, for example the ready position or an intermediate back-up position between the flush and ready positions.

Examples of such mechanical or electrical failures requiring actuation through the push-push unit comprise for example failure of the battery (empty, faulty, short-circuited, disconnected etc.), failure of the motor (jamming, faulty contacts, altered or broken components, etc.), failure of the grid itself (failure in electronic command unit, broken, disconnected, corroded or altered current feed cable, etc.) or a failure in the transmission mechanism relaying the torque from the motor to the handle lever 3 (jammed or broken reduction gear, worn out meshing teeth etc.).

Though not a technical failure, another possible use of the push-push unit may be in case a person having a key and no security token (e.g. RFID access card or token) wishes to open the door panel 100, since detection of the security token in a predetermined vicinity of the vehicle can be used as trigger to automatically bring the handle lever 3 in ready position through use of the electric motor.

Figure 2:
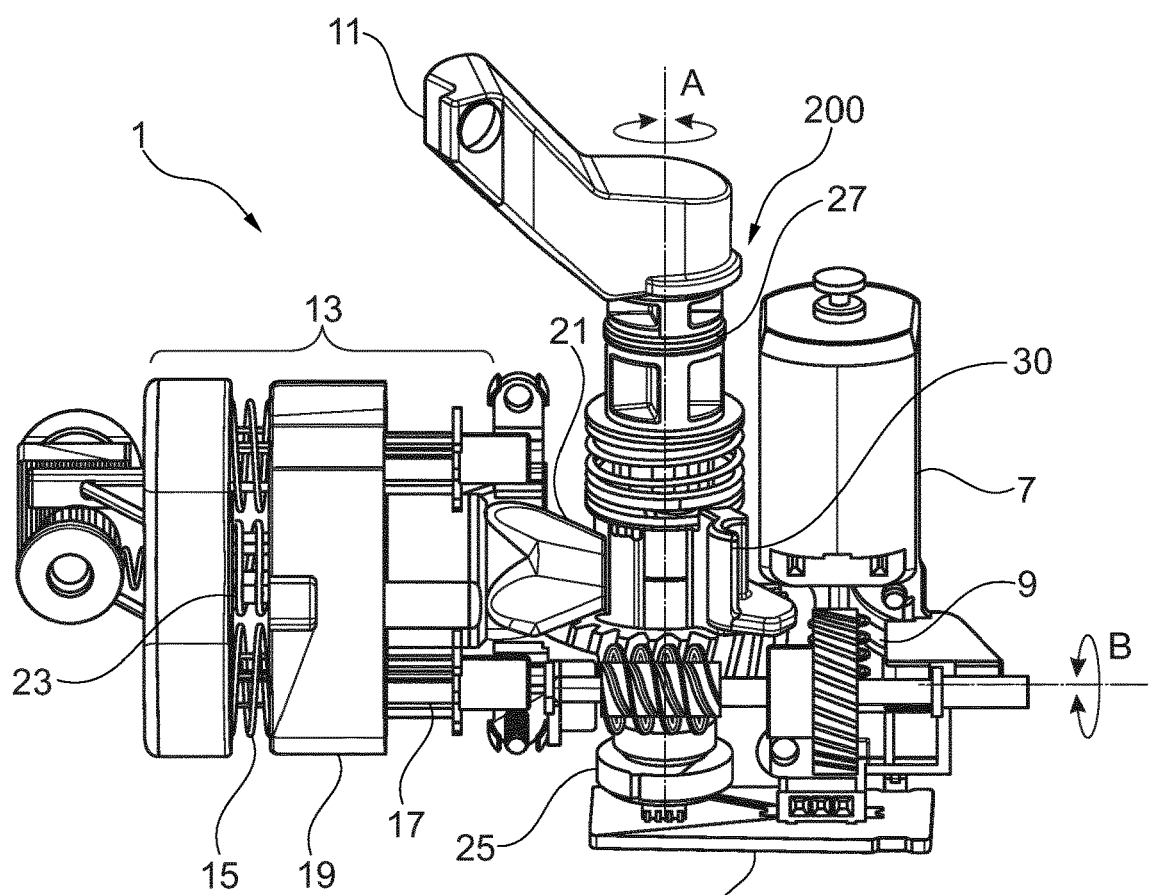
FIG. 2 is a schematic view of a vehicle door handle.

FIG. 2 is a view of the door handle 1 from inside. In FIG. 2, the handle lever 3 is rotatively mobile with respect to the handle frame 5 (not represented in FIG. 2 for clarity), which is to be attached to an interior surface of the vehicle door panel 100. The frame 5 comprises housings for most parts of the door handle 1.

An electric motor 7 with a reduction mechanism 9 sets the lever 3 in motion when actuated. The electric motor 7 is activated by injection of electric current, in particular from a vehicle battery. The reduction mechanism 9 adapts the rotary output motion of the electric motor 7 by reducing rotational speed and increasing the torque.

The reduction mechanism 9 is part of a transmission device 200. The transmission device 200 sets in motion a lever base 11, to which a handle lever body (not represented) is attached upon assembling the handle 1 to obtain the assembled handle lever 3.

The handle 1 also comprises a push-push unit 13, comprising two push-push springs 15, placed around two guiding rods 17. The push-push springs 15 push, when released, a slider 19 carrying a protruding tip 21 which rests against a push-push lever 30 of the transmission device 200. The protruding tip 21 is in particular made of rubber, soft plastic or any shock absorbing material.

The springs 15 and guiding rods 17 are placed on each side of a release mechanism 23, which, when being compressed (in clicking position) by the push-push lever 30 pushing the protruding tip 21, releases the slider 19 which is then pushed by the springs 15 along the guiding rods 17, pushing the handle lever 3 in ready or back-up position.

The rotational position of the handle lever 3 is detected by positioning means 25, attached at the end of a lever shaft 27 which rotates with the handle lever 3. Said positioning means 25 comprise a magnetic index and a magnetic sensor (e.g. a Hall effect sensor). The magnetic index rotates with the lever shaft 27 and the handle lever 3, the magnetic sensor then determinates the rotational position of the magnetic index, and thus the position of the handle lever 3.

The positioning means 25, such as a sensor in particular a Hall effect sensor, when, for instance attached at an end of the lever shaft 27 provides the exact rotational position of the transmission mechanism 200 of the door handle 1. Such information provided to an electronic control unit E allows commanding the movement of the lever shaft 27 back to flush position or its movement to a ready position from the flush one. It can also be used to lock and unlock an electronic latch in accordance.

The positioning means may alternatively be located on the radial side of the lever shaft 27.

The electronic control unit E is in particular connected on one hand to the positioning means, to receive a signal representing the rotational position of the handle lever 27, and on the other hand to the electric motor 7. The electronic control unit E controls for example the electric current feed of the electric motor 7, in order to modify the detected rotational position of the handle lever 27 according to specific instructions.

Figure 3:
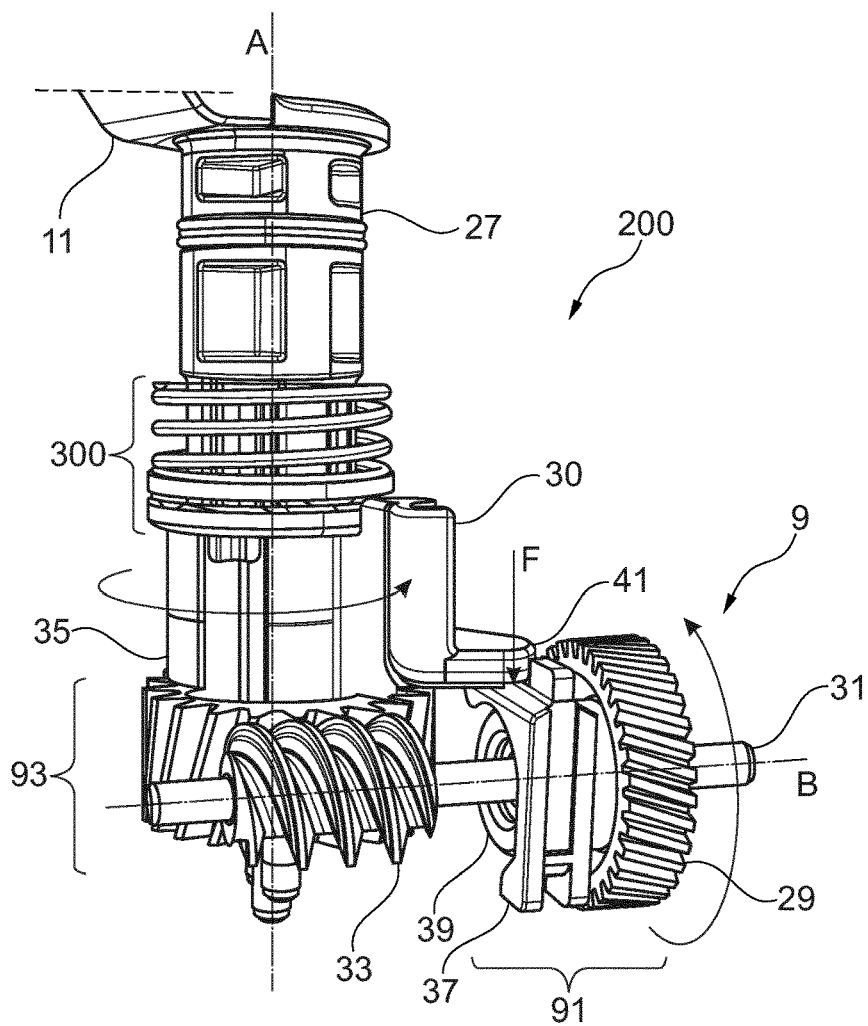
FIG. 3 is a schematic view of the transmission mechanism of the handle of FIG. 2,
FIGS. 4a, 4b are schematic views of a portion of the mechanism of FIG. 3,
FIGS. 5a, 5b, 5c are schematic side views of a portion of the transmission mechanism in different lever positions and the representation of the angular domains in which either configuration is adopted.

FIG. 3 is a view of the transmission device 200, viewed separately.

In FIG. 3, the transmission device 200 comprises the lever shaft 27, which extends axially from the lever base 11, and the reduction mechanism 9.

The reduction mechanism comprises a first reduction stage 91 and a second reduction stage 93, having each a worm drive. The worm drive of the first reduction stage 91 comprises a first worm (not visible in FIG. 3) and a first worm gear 29, and the worm drive of the second reduction stage 93 comprises a second worm 33 and a worm gear 35.

The first worm of the first reduction stage 91 (not visible in FIG. 3) is set in motion by the torque applied by the electric motor 7. The first worm of said first reduction stage 91 sets in turn the first worm gear 29 in rotational motion around a second axis B, orthogonal to the first axis A. The rotational motion of the first worm gear 29 is transmitted by a reduction shaft 31 to the second worm 33 of the second reduction stage 3.

The second worm 33 of the second reduction stage 93 sets the second worm gear 35 in motion. The second worm gear 35 is rotationally coupled to the lever shaft 27. In particular, in this embodiment, the second worm gear 35 forms the portion of the lever shaft opposite the lever base 11.

The second worm gear 35 comprises a tubular body, forming the lower axial portion of the lever shaft 27 in FIG. 5, its lower extremity carrying teeth which mesh with the second worm 35 to form the worm drive. The push-push lever 30 is radially protruding from the tubular body of the second worm gear 35.

The transmission mechanism 200 comprises a brake mechanism frictionally engaging a rotating element of the first or second reduction stage 91, 93 of the reduction mechanism 9 when the lever shaft 27 reaches a predetermined rotational position between the ready and flush positions of the handle lever 3, hereafter called braking position. The braking action of the brake mechanism then stops the handle lever 3 in a position corresponding to the ready position, in which said lever 3 is graspable by the user.

In particular, said brake mechanism comprises a braking pad 37, and positioning means of said braking pad 37; which, when the braking position of the handle lever 3 is reached, press the braking pad 37 against a rotating element of the reduction mechanism 9.

The braking pad 37 is in this particular embodiment a plastic element resting against an axial, cylindrical protrusion 39 of the first worm gear 29. A radially protruding finger 41, here a portion of the push-push lever 30, applies pressure on the braking pad 37, in particular from the rotational position of the lever shaft 27 corresponding to the braking position of the handle lever 3, to stop the handle lever 3 in a rotational position close to its ready position.

In particular, the braking position, the form, the size and the friction coefficients of the braking pad 37 and the cylindrical protrusion 39 can be chosen so that the handle lever 3 is stopped in a predetermined ready position.

In other embodiments, the protruding finger 41 and the push-push lever 10 may be distinct radially protruding elements, and may be placed on elements other than the second worm gear 35 rotating with the lever shaft 27, such as the lever shaft 27 itself or any element rotating with said lever shaft 27.

Figure 4A:
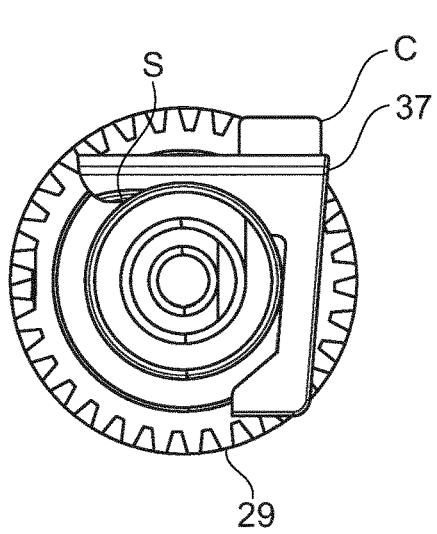
Figure 4B:
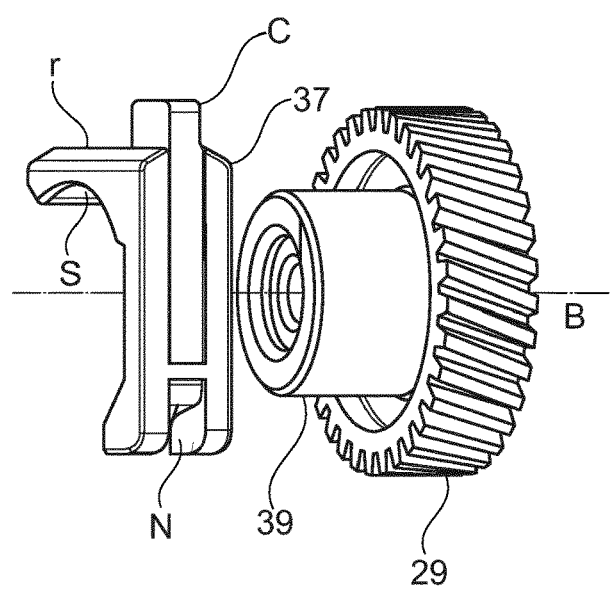

The braking pad 37 and the first worm gear 29 carrying the cylindrical protrusion 39 are represented in more detail in FIGS. 4a, 4b, respectively in an axial view and in an exploded side view.

The braking pad 37 comprises here a circular arc surface S, with a diameter slightly greater than the diameter of the cylindrical protrusion 39, and which is pressed against said cylindrical protrusion 39 when pressure is applied by the radially protruding finger 41.

The radial surface of the cylindrical protrusion 39 and the circular arc surface S may be treated so as to increase friction, for example by coating them with rubber or by increasing the roughness of said surfaces.

The braking pad 37 comprises guiding means, here in form of a guiding crest C and a guiding notch N, respectively on the side of the braking pad 37 facing the protruding finger 41 (for the guiding crest C) and the one opposite said side (for the guiding notch N). The guiding means C, N restrain the movement of the braking pad 37 to translation along a line parallel to the rotation axis A of the lever shaft 27 through guiding elements (complementary rails or notch and finger, not represented) of the frame 5.

The side of the braking pad 37 facing the radially protruding finger 41 also has an inclined transverse portion forming a ramp r against which the radially protruding finger 41 is pressed when the handle lever 3 reaches the braking position.

Figure 5A:
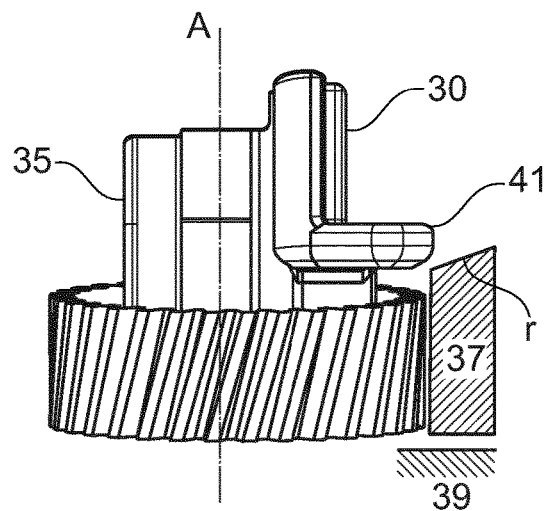
Figure 5B:
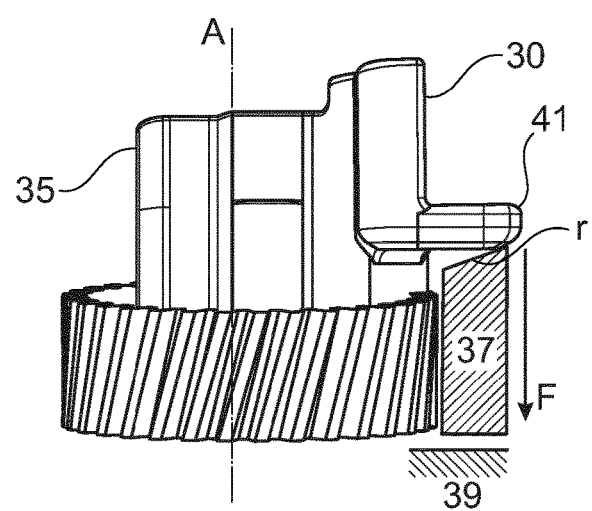

The operation of the second worm gear 35, the braking pad 37 and the cylindrical protrusion 39 are represented schematically in FIGS. 5a, 5b.

In FIG. 5a, the second worm gear 35, braking pad 37 and cylindrical protrusion 39 are represented in a configuration corresponding to a lever position 3 in which the braking pad 37 is not engaged, for example the flushing position.

In FIG. 5b, the second worm gear 35, braking pad 37 and cylindrical protrusion 39 are represented in a configuration corresponding to a rotational position comprised between the braking and ready positions of the handle lever 3, in which the braking pad 37 frictionally interacts with the cylindrical protrusion 39.

In both figures, the braking pad 37 and cylindrical protrusion 39 are represented by a portion of their intersection with a cut-away plane containing the second axis B. The protruding finger 41 is in contact with the breaking pad 37 through a ramp r on the side of the breaking pad 37 opposite the cylindrical protrusion 39.

The rotation of the second worm gear 35 (horizontal arrow of FIG. 5a) causes the protruding finger 41 to press against the ramp r, and thus to push the braking pad 37 down and to press said braking pad 37 against the cylindrical protrusion 39 with a force F to generate a friction torque when the lever 3 reaches the braking position.

Figure 5C:
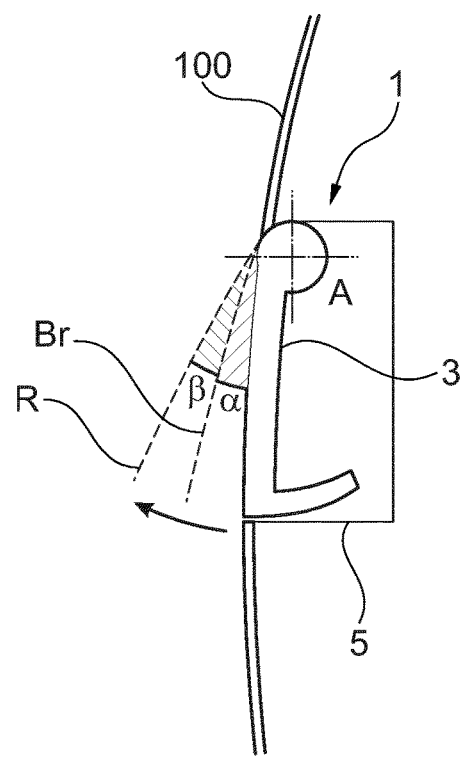

In FIG. 5c, the handle 1 is represented as a schematic cutaway of a vehicle door panel 100 having a built-in door handle 1 in a similar fashion as in FIG. 1.

The handle lever 3 is represented in the flush position, while two outlines are represented in dotted lines of its outmost side in two, outwards oriented positions, respectively the braking Br and ready R positions.

In the flush position, the braking pad 37 is set apart with respect to the cylindrical protrusion (as in FIG. 5a). When rotating outwards from the flush position (arrow in FIG. 5c), the lever 3 reaches first the breaking position Br after rotating by a first angle α. In the braking position Br, the braking pad 37 comes in contact with the cylindrical protrusion 39 (as in FIG. 5b). The braking action of the braking pad 37 brings the handle lever to a stop in the ready position R after rotating further outwards by a second angle β. The frictional behaviour and the force with which the braking pad 37 is pressed against the cylindrical protrusion 39 determine the second angle β, during which the rotational speed of the handle lever 3 decreases until stopping.

Figure 6:
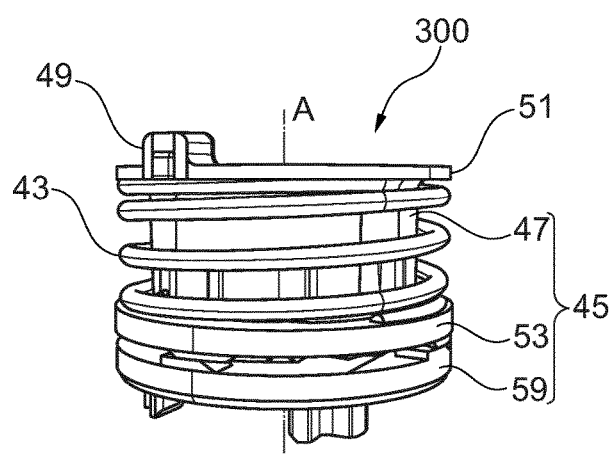
FIG. 6 is a side view of a cage and spring system for the invention.
Figure 7:
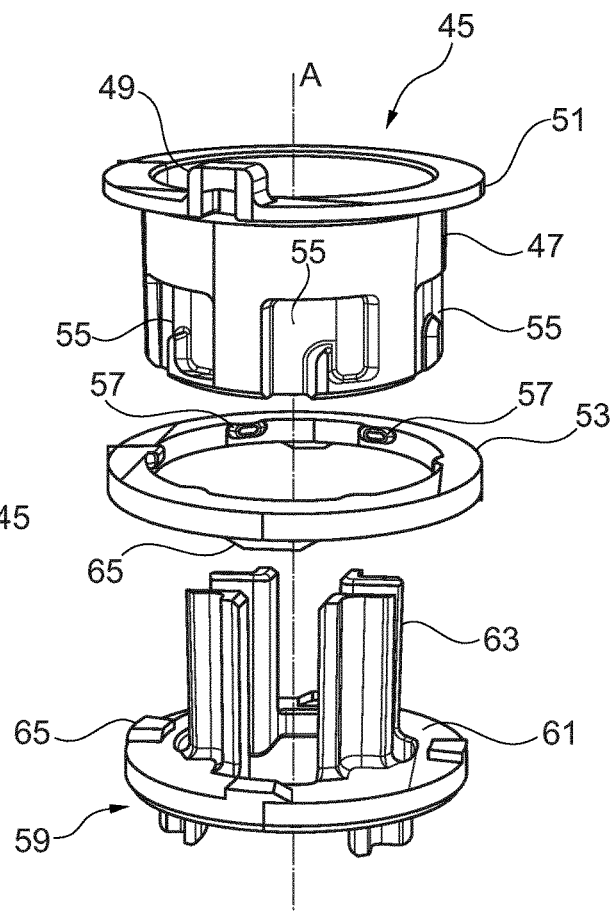
FIG. 7 is an exploded view of the cage of the cage and spring system of FIG. 6,
FIGS. 8a, 8b are schematic views of portions of the cage of FIGS. 5 and 6 in different lever positions.

To generate a more uniform friction torque, the force F applied on the braking pad 37 is controlled by applying a predetermined axial force on the second worm gear 35 itself through a spring and cage system 300, visible in FIG. 3, and represented in more detail in FIG. 6, and in exploded view in FIG. 7.

The spring and cage system 300 comprises a preconstrained spring 43, contained and constrained in a cylindrical spring cage 45 which surrounds an axial portion the lever shaft 27. It exerts a strength on the here axially mobile second worm gear 35, which is still bound in rotation to the lever shaft 27.

The spring 43 is a metallic coil spring, for example of stainless steel which surrounds the spring cage 45 and in turn an axial portion of the lever shaft 27. The spring 43 in particular fits the tubular axial outer contour of the spring cage 45.

The spring cage 45 comprises a tubular housing 47, which comprises an axial finger 49, cooperating with a recess of the frame 5 (not represented) to maintain the tubular housing 47 fixed in rotation with respect to the frame 5 when the lever 3 is rotated.

The tubular housing 47 also comprises a radial flange 51 against which an end of the spring 43 rests in the assembled state, here on its axial end facing the lever base 11.

The spring cage 45 comprises a locking ring 53, which is bound in rotation and axially mobile with respect to the tubular housing 47, on the axial end of said tubular housing 47 opposite the radial flange 51. In particular, the tubular housing 47 comprises L or J-shaped grooves 55, which cooperate with inward pointing pins 57 of the locking ring 53 and the spring 43 to form a bayonet mount. The grooves 55 allow a limited axial movement of the locking ring 53 with respect to the tubular housing 47 while locking it in rotation.

The spring and cage system 300 further comprises an activation ring 59, bound in rotation with the lever shaft 27. The activation ring 59 comprises an annular body 61 matching the locking ring 53, and, in this embodiment, axial stems 63 which engage on one side with the lever shaft 27, and on the other with the second worm gear 35, which they consequently bind in rotation. The axial stems 63 give the activation ring 59 a cross pattern central opening, matching the cross-section of the lever shaft 27 on at least the axial portion surrounded by the spring and cage system 300.

The locking ring 53 and the activation ring 59 comprise, on their sides facing each-other, axial spacing protrusions 65, regularly distributed and facing each other when the handle lever 3 reaches the ready position.

Figure 8A:
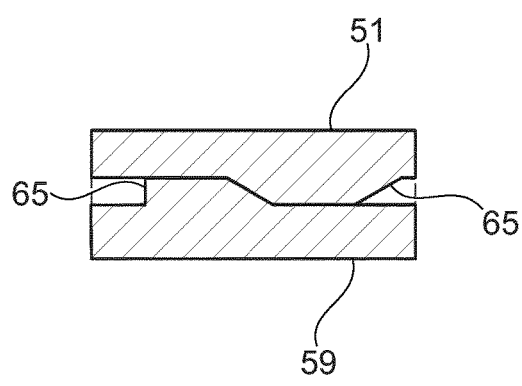
Figure 8B:
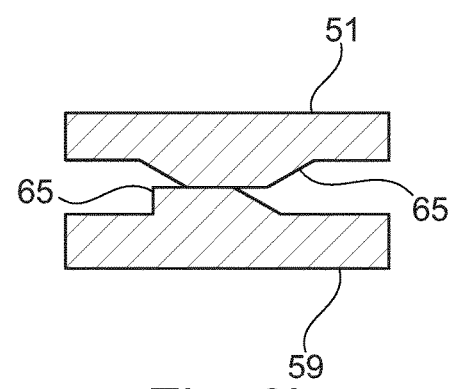

A portion of the locking ring 53 and of the activation ring 59 with each one spacing protrusion 65 is represented in FIGS. 8a, 8b, respectively in a position not comprised between the braking and ready positions of the handle lever 3 (braking pad 37 not engaged, FIG. 8a), and in a position corresponding to the ready position of the handle lever 3 (braking pad 37 engaged, FIG. 8b).

When the handle lever 3 reaches the ready position (FIG. 8b), the spacing protrusions 65 push the locking 53 ring towards the radial flange 51 of the tubular housing, thus compressing the spring 43 to increase the constriction of the spring 43 between the braking and ready positions of the handle lever 3.

The increase in constriction of the spring 43 increases the axial force applied on the second worm gear 35. Consequently the force F applied on the braking pad 37 is increased and in turn this increases the friction torque on the cylindrical protrusion 39 of the first worm gear 29.

The spacing protrusions 65 are trapezoidal, with lateral ramps on both sides on the locking ring 53, and only on one side on the activation ring 59. The ramps and trapezoidal forms can be designed to shape the resistive torque increase around the braking position of the handle lever 31. The overall height of the spacing protrusions 65 conditions, in relationship with the stiffness of the spring, the value of the increase in force F.

The transmission mechanism 200 and the associated door handle 1 present in consequence a more stable final resting position corresponding to the ready position, in particular more stable and uniform over a wider temperature range, whereas reversible transmission mechanisms can jam or spontaneously reverse when the temperature is too low or too high. The brake mechanism 37, 41 is in particular engaged in the last phase of the opening motion and in turn in the first stage of the closing motion, thus defining a robust and stable ready position.

The transmission mechanism 200 and the associated door handle 1 will also keep a more stable ready position over a possibly longer lifetime, since the brake mechanism prevents wear of the transmission mechanism 200 due to unwanted reverse actuation, and even when said transmission mechanism is worn, the braking pad 37 will still lock the handle lever 3 in ready position.

Moreover, the spring and cage system 300 allow the force F and consequently the friction torque to be foreseeably constant or at least reduce the variations of said torque with component fatigue and temperature.

The invention claimed is:

1. A transmission mechanism for a vehicle door handle, the vehicle door handle comprising a handle lever, movable between a flushing position being flush with an exterior door panel surface and a ready position protruding and graspable by a user, the transmission mechanism being configured to be attached on one side to the handle lever and on another side to an electric motor, the transmission mechanism comprising:
   a lever shaft, configured to be connected to the handle lever, a rotation of which causes motion of the handle lever between the flushing and ready positions;
   a reduction mechanism, configured to adapt an output torque of the electric motor into a rotational motion of the lever shaft, comprising a first reduction stage and a second reduction stage, each having a worm drive, the worm drive of the first reduction stage comprising a first worm and a first worm gear, and the worm drive of the second reduction stage having a second worm and another worm gear rotationally coupled to the lever shaft; and
   a brake mechanism frictionally engaging a rotating element of one of the reduction stages of the reduction mechanism when the lever shaft reaches a rotational braking position comprised between the flush and ready positions of the handle lever, to stop the lever shaft in a position in which the handle lever is in the ready position,
   wherein the brake mechanism comprises a braking pad and the lever shaft comprises a radially protruding finger, the radially protruding finger and the braking pad being configured so that when the lever shaft reaches a rotational position corresponding to the braking position of the handle lever, the radially protruding finger presses the braking pad against the rotating element of one of the reduction stages of the reduction mechanism, and
   wherein the first worm gear of the first reduction stage comprises an axial cylindrical protrusion, against which the braking pad is pressed when the handle lever reaches the braking position.

2. The transmission mechanism according to claim 1, wherein the braking pad comprises a circular arc surface matching the axial cylindrical protrusion and which is pressed against the axial cylindrical protrusion when the handle lever reaches the braking position.

3. The transmission mechanism according to claim 1, wherein the braking pad comprises a ramp on which the radially protruding finger of the lever shaft is pushing when reaching the braking position.

4. The transmission mechanism according to claim 1, wherein the radially protruding finger is an extension of a push-push lever configured to cooperate, when the vehicle door handle is assembled, with a push-push unit to bring the lever to a position that is graspable by the user in case of mechanical or electrical failure of an electric actuation mechanism.

5. The transmission mechanism according to claim 1, wherein the rotational position of the handle lever is detected by positioning means, attached to the lever shaft so as to determine the rotational position of the lever shaft and command movement of the lever shaft back to the flush position or into the ready position using an electronic control unit connected to the positioning means and to the electric motor.

6. The transmission mechanism according to claim 1, further comprising a preconstrained spring fitting the contours of a cylindrical spring cage surrounding the lever shaft, which exerts, when the handle lever reaches the braking position, a strength on the braking pad, pressing the braking pad on the rotating element of the reduction mechanism.

7. The transmission mechanism according to claim 6, wherein the cylindrical spring cage comprises:
   a tubular housing, bound in rotation to a stationary handle frame, having a radial flange on which one end of the preconstrained spring rests,
   a locking ring, mobile axially and bound in rotation with the tubular housing, against which another end of the preconstrained spring rests, and
   an activation ring, rotationally linked to the lever shaft, pressed against the locking ring, and
   wherein the locking ring and the activation ring comprise axial spacing protrusions facing each other when the handle lever reaches the braking position so as to increase a constriction of the preconstrained spring between the braking and ready positions of the handle lever.

8. The transmission mechanism according to claim 7, wherein the axial spacing protrusions comprise trapezoidal protrusions, which are regularly distributed on the locking ring and the activation ring.

9. The transmission mechanism according to claim 7, wherein the tubular housing comprises L-shaped or J-shaped grooves, which cooperate with pins of locking ring and the preconstrained spring to form a bayonet mount.

10. A vehicle door handle, having a handle lever movable between a flushing position being flush with an exterior door panel surface and a ready position protruding and graspable by a user, comprising:
   an electric motor configured to set the handle lever in motion; and
   a transmission mechanism, connected on one side to the electric motor and on another side to the handle lever, comprising:
      a lever shaft, configured to be connected to the handle lever, a rotation of which causes motion of the handle lever between the flushing and ready positions,
      a reduction mechanism, configured to adapt an output torque of the electric motor into a rotational motion of the lever shaft, comprising two reduction stages, each with a worm drive comprising a worm and a worm gear, the worm of the first reduction stage being set in motion by the electric motor, and the worm gear of the second reduction stage setting the lever shaft in rotation,
      a brake mechanism frictionally engaging a rotating element of one of the reduction stages of the reduction mechanism when the lever shaft reaches a rotational braking position comprised between the flush and ready positions of the handle lever, to stop the handle lever in the ready position,
   wherein the brake mechanism comprises a braking pad and the worm gear of the first reduction stage comprises an axial cylindrical protrusion, against which the braking pad is pressed when the handle lever reaches the braking position.

11. The vehicle door handle according to claim 10, further comprising a push-push unit to bring the lever to a position that is graspable by the user in case of a failure of the electric motor by interacting with a radially protruding push-push lever bound in rotation with the lever shaft.

12. The vehicle door handle according to claim 11, wherein the lever shaft comprises a radially protruding finger, the radially protruding finger being an extension of the push-push lever.

13. The vehicle door handle according to claim 12, wherein the radially protruding finger and the push-push lever are two different radially protruding elements bound in rotation with the lever shaft.

14. The vehicle door handle according to claim 10, wherein the braking pad comprises a circular arc surface matching the axial cylindrical protrusion and which is pressed against the axial cylindrical protrusion when the handle lever reaches the braking position.

15. The vehicle door handle according to claim 10, wherein the braking pad comprises a ramp on which a radially protruding finger of the lever shaft is pushing when reaching the braking position.

16. The vehicle door handle according to claim 10, wherein the lever shaft comprises a radially protruding finger and the radially protruding finger is an extension of a push-push lever configured to cooperate, when the vehicle door handle is assembled, with a push-push unit to bring the lever to a position that is graspable by the user in case of mechanical or electrical failure of an electric actuation mechanism.

* * * * *